United States Patent [19]

Dybdal et al.

[11] Patent Number: 5,781,845
[45] Date of Patent: Jul. 14, 1998

[54] ADAPTIVE TRANSMITTING ANTENNA

[75] Inventors: Robert B. Dybdal, Palos Verdes Estates; Samuel J. Curry, Redondo Beach, both of Calif.

[73] Assignee: The Aerospace Corporation, El Segundo, Calif.

[21] Appl. No.: 758,710

[22] Filed: Dec. 3, 1996

[51] Int. Cl.$^6$ ............................................. H04B 7/01
[52] U.S. Cl. ..................... 455/65; 455/63; 455/103; 455/504; 342/380; 342/383; 375/296; 375/343
[58] Field of Search ........................... 455/504, 506, 455/103, 104, 105, 63, 67.3, 276.1, 65, 562; 375/295, 296, 343; 342/357, 358, 380, 383

[56] References Cited

U.S. PATENT DOCUMENTS

| | | | |
|---|---|---|---|
| 4,567,602 | 1/1986 | Kato et al. | 375/296 |
| 5,028,931 | 7/1991 | Ward | 342/383 |
| 5,471,647 | 11/1995 | Gerlach et al. | 455/63 |

*Primary Examiner*—Nguyen Vo
*Assistant Examiner*—Lee Nguyen
*Attorney, Agent, or Firm*—Derrick Michael Reid

[57] ABSTRACT

An adaptive transmitting antenna includes an array of antenna elements having respective weighing coefficients to respectively transmit components of a transmit signal which reduces locally reflective multipath signals received by the transmitting antenna to sample respective reflective components which are summed and cross correlated to a time delayed transmit signal to produce a correlated output indicative of the reflective signal strength. The correlated output is minimized by adjusting the weighing coefficients so that the transmit signal has reduced multipath distortions. The adaptive technique is well suited for mobile telephone transmitters moving about objects tending to reflect and distort transmitted signals.

4 Claims, 3 Drawing Sheets

Adaptive Transceiver

Adaptive Transmitter

GPS Adaptive Transmitter

Adaptive Transceiver

5,781,845

ADAPTIVE TRANSMITTING ANTENNA

STATEMENT OF GOVERNMENT INTEREST

The invention was made with Government support under Contract No. FO 4701-93-C-0094 by the Department of the Air Force. The Government has certain rights in the invention.

The invention described herein may be manufactured and used by and for the government of the United States for governmental purpose without payment of royalty therefor.

STATEMENT OF RELATED APPLICATION

The present patent application is related to applicant's copending application Ser. No. 08/758,709, filed: Feb. 03, 1996, entitled Adaptive Receiving Antenna.

FIELD OF THE INVENTION

The present invention relates to the field of antenna transmission. More particularly, the present invention relates to adaptive techniques for a transmitting antenna.

BACKGROUND OF THE INVENTION

Communication systems typically include transmitters for transmitting signals and receivers for receiving the transmitted signals. Some systems have used adaptive techniques to improve the reception of transmitted signals. Adaptive receiving antenna are adaptively reconfigured to optimize signal reception, and a wide variety of technology has been demonstrated for different applications. For example, U.S. Pat. No. 3,202,990 granted to Howells on Aug. 24, 1965 discloses a receiving antenna system for modifying a received antenna pattern in response to interference capable of degrading reception.

Transmitted signals may be reflected by objects positioned near the transmitter causing reflected signals that distort the transmitted signals producing multipath transmitted signals, which may appear as ghost or shadow signals upon reception. As the transmitter is moved from one position to another, or as interfering objects may be moved from time to time relative to the transmitter, differing multipath transmitted signals and differing reflecting interfering signals are created. The collection of multipath signals will vary in level and delay from the transmit signal. These reflected signals are collectively referred to as multipath signals. Multipaths create distortion of the transmitted-received signals. The multipath signals interfere with and degrade both the transmission signals quality and transmitted signal reception. The most familiar example of multipath degradation is the ghosts that can appear in television video signals caused by delayed reflected signals. Adaptive techniques have been employed to improve the ability to receive multipath transmitted signals. One problem with differing multipath signals including the reflected interfering signals is the distortion of the received signal degrading the performance of a receiver to receive the transmitted signals. Such is the case when using mobile telephone systems where a telephone transmitter is moved during operational use.

In mobile communication systems, user antennas necessarily provide broad coverage characteristics, so that the user is not required to precisely align the antenna when communicating with another terminal and so that the user has a compact antenna design. Broad antenna coverage is sensitive to multipath signals providing an inherent degradation caused by signals reflected from nearby objects. The user experiences not only a direct line of sight signal component but also reflected signals that are delayed in time because of their longer path length.

There are a variety of ways of reducing multipath degradation to received signals. The adaptive combination of antenna elements and adaptive equalization to reduce the effects of time delay differences between the direct line of sight signal and multipath signal to improve signal reception. However, communication systems disadvantageously do not provide adaptive control of transmitted signals. For example, transmitting antennas referred to as retrodirective arrays derive the direction of the transmitted signal from the direction with which the received signal arrives. These retrodirective transmitting antennas derive their capabilities from fixed design techniques, and disadvantageously do not change the characteristics of the transmitted antenna in accordance with the environment and surrounding objects of the antenna at the time of transmission.

Conventional adaptive antenna designs reduce interference when the system is receiving a transmitted signal. Multipath distortion is reduced by the proper selection of weighting coefficients for transversal equalization for a plurality of antenna elements. Cross correlation techniques use adaptive weighting values. The adaptive technique changes and adapts the antenna pattern to maximize the received signal while minimizing interference. Adaptive antenna systems use weight and control, cross-correlation and transversal-equalization techniques to improve the reception of the transmitted signal. In many communication systems, frequency division multiple access (FDMA), time division multiple access (TDMA) and code division multiple access (CDMA) techniques having embedded code and carrier modulation are used to increase the capacity of communication systems. Conventional adaptive techniques have been successfully used with the multiple access techniques.

CDMA provides users with respective embedded codes which enable processing techniques to acquire desired signals for respective different users. The ability to detect the embedded codes and separate out respective desired signals is degraded by multipath reflections from objects surrounding the transmitter that distort the transmitted signal and hence the received signal. An adaptive receiving antenna has a plurality of receiving antenna elements with respective optimal weighting coefficients to reduce multipath interference. During reception, the weighting coefficients are adjusted to maximize the strength of the primary CDMA signal in the presence of multipath distortions. A CDMA spread spectrum transmitted signal is cross correlated upon reception with a known code to isolate a desired coded transmitted signal. However, multipath signals that are partially coherent with the desired coded transmitted signal will also pass through the cross correlation and be revealed as superimposed distortion signals. Each of the CDMA spread spectrum codes are assigned to respective users. Each CDMA spread spectrum has a unique Auto Correlation Function having a unity gain when the CDMA transmitted signal is time aligned with the code generated internally by the receiver. Auto Correlation has substantial sidelobes. When multipath signals are time delayed from the primary transmit signals the code cross-correlation results in superimposed distortion. Auto Correlation Function determines the time delayed values. Cross correlation of the received signal and the CDMA coded signals delayed at time delay values is used upon reception to generate coherent multipath reflection signals which are subtracted from the main signal to remove the superimposed distortion and thereby equalized the receive signal to the primary transmit signal.

Even though such receiving antenna have employed adaptive techniques to equalize the receive signal to the primary transmit signal, so as to adequately receive the transmitted signal, the transmitters are still subject to juxtaposed objects causing multipath transmitted signals producing multipath distortion of the transmitted signals. One problem with adaptive receiving antenna is the inability to improve the quality of the transmitted signals. Adaptive receiving antenna do not affect the transmitters nor reduce the creation multipath signals and distortion during transmission. Multi-access transmitters disadvantageously do not adaptively reduce reflected interfering multipath signals.

In terrestrial communication networks having a stationary repeater relay station, such as a cellular communications system, a mobile transceiver transmits a signal towards the relay station which retransmits the signal to another user. Mobile adaptive receivers reduce multipath signals received by the transceiver. The relay station can receive and then retransmit a high quality signal to a receiver with reduced multipath. Existing cellular networks using terrestrial stationary relay stations can transmit a coded signal for adaptive combination and equalization in the receiver to reduce multipath distortions. The adaptive receiver uses cross correlation combination and equalization of received signals. The relay station can transmit coded signals for a particular transceiver within a group of transceivers covered within a broadcast area from the relay station. Such adaptive techniques are successful for terrestrial communication network using stationary relay stations, particularly where there is a relatively low number of transceivers operating within the broadcast area of the relay station. As the number of transceivers, and therefore respective coded signals, increase within a given broadcast area, adaptive techniques will become less effective because of an inability to effectively isolate one coded signal from another over a communication bandwidth. One problem for the mobile communication system is that broad antenna coverage is susceptible to multipath distortions. Multipath distortions of the transmitted and received signals reduce isolation of the coded signals of respective users. Extraterrestrial satellite communications systems are also relay stations that cover a large broadcast area covering a large number of mobile transceivers that are also subject to multipath distortion and reduced isolation between coded signals.

There is a finite distance between the relay station and a mobile transceiver resulting in finite transmission delay which limit the application of receiving adaptive control between the mobile receiver and the mobile transmitter. The resulting transmission delays are too large to function within a close loop adaptive technique. Mobile transceivers communicating with terrestrial and extraterrestrial relay stations suffer from a lack of closed loop control and adaptive techniques to reduce multipath signals and reflections. The mobile transceiver disadvantageously only employs receiving adaptive techniques which operate independent of the relay station.

Both terrestrial relay stations, extraterrestrial satellites and relay stations use different transmit and received frequencies. Because the receive and transmit frequencies are different, the parameters for receive and transmit operations are not identical because multipath components decorrelate with frequency change. Hence, the transmitter only transmits the transmit signals, while the receiver employs the adaptive techniques. Antenna elements in an array have a finite distances between array elements for vectored communications. An antenna element array operates in either a receive mode or a transmit mode. Transceivers may employ two antenna element arrays to enable simultaneous transmission and reception. In such cases, the transmitting array is vectored towards the relay station while the receiver employs adaptive techniques on the received signals from the relay station. The problem of multipath distortion when receiving is solved using conventional adaptive techniques upon reception and vectored transmitted signals upon transmission. Mobile transmitters generate multipath distortions which are reduced by adaptive techniques employed by the receivers. A mobile RAKE receiver implements the adaptive combination and equalization to reduce multipath distortion of received signals. However, the mobile transmitters do not use adaptive techniques to minimize multipath reflection generated proximal to the transmitter. Multipath distortion generated proximal to the transmitter may create multipath distortions at the receiver. Hence, the adaptive techniques are used to reduce multipath distortions within the receiver without attempting to reduce multipath signals generated at the transmitters. These and other disadvantages are solved or reduced using the present invention.

SUMMARY OF THE INVENTION

An object of the invention is to provide adaptive control of transmitted signals.

An object of the invention is to reduce multipath signals of transmitted signals.

Another object of the invention is to adaptively control the characteristics of a transmitting antenna in response to the environment surrounding the antenna so that the transmitted signal is not degraded or corrupted by reflected and delayed transmitted signals.

Another object of the invention is to reduce multipath reflections of transmitted signals.

Yet another object of the invention is to adaptively modify the transmitting antenna in response to multipath reflectors in the vicinity of the transmitting antenna.

Still another object of the invention is to adaptively optimize transmission performance as the location of the transmitting antenna changes.

Still a further object of this invention is to adaptively reduce distortions of transmitted signals received by multiple receivers.

A further object of the invention is to adaptively control both the transmitting and receiver antenna as an adaptively controlled transceiver system.

Another object of the invention is to reduce multipath reflections of transmitted signals from a transmitter communicating with a satellite using GPS positioning.

Still another object of the invention is to reduce mutlipath reflections of transmitted signals of a mobile transceiver.

Another object of the invention is to minimize transmission of multipath reflections by varying transmission weighting coefficients of transmission antenna elements.

Yet another object of the invention is to minimize reflections of a transmitted signal by correlating sampled reflections to time delayed transmitted signals providing a correlated output indicative of the strength of the reflective signals.

The present invention uses several antenna elements combined with adaptive weighing circuitry to optimize the performance of transmitting antenna system. In operation, the antenna elements are connected to a transmission signal source. The transmitted signal is partially reflected back to the transmitting antenna and correlated with time delayed replicas of the transmitted signal to provide a measure of the illumination of nearby obstacles that cause multipath reflections. Adaptive control techniques are used to minimize the correlation outputs and hence to minimize the reflected transmitted signal components so as to reduce multipath reflections as sampled at the transmitter to generate a transmitted signal with reduced mutlipath signals. Preferably, the adaptive transmitter has a plurality of antenna elements with respective weighting coefficients that are adjusted by a programmed processor to reduce localized interference and multipath signals. A transmit signal is transmitted by the antenna elements using the respective weighting coefficients. The array of antenna elements are also used to sample the reflected multipath signals which are summed together and cross correlated to the time delayed transmit signal to provide a correlated output signal which measures the strength of the reflected multipath signals which is then minimized by adjusting the weighting coefficients. In this manner, the transmitter uses an array of antenna elements and weighting coefficients to adaptively reduce localized multipath signals for improving the quality of the transmitted signal.

The system can be applied to personal communication system, such as a CDMA design. The individual users have signal spectrums within the bandwidth allocated to a transponder and are assigned orthogonal codes to isolate user signals from each other. Multipath distortions of the transmitted and received signals reduce the code isolation. The adaptive transmitter reduces multipath distortions for improved isolation between coded users signals. A transmitted coded signal within a CDMA scheme is preferably used. The cross correlation properties enhance signal isolation by reducing multipath reflections. Objects that reflect and result in multipath signals in the environment surrounding the transmitting terminal can be detected. The time delays used in the cross correlation processing are selected to detect multipath reflections at ranges that distort the transmitted signal. The adaptive transmitter operates to reduce the reflections that cause multipath. The adaptive transmitter preferably includes beam steering techniques to direct the communication beam towards the communication receiver, such a satellite or relay station. A steering vector may be used to project antenna gain pattern towards the receiver, as well as providing adaptive transmit control.

The present invention provide an ability to adaptively modify the characteristics of a transmitting antenna to optimize system performance for arbitrary antenna locations. The present invention is particularly useful in improving the performance of mobile communication systems and can be used in other systems as well. The present invention enables independent adaptive transmission over long transit time to distal satellites or remote relay stations. The adaptive transmitter functions independent of the transit time when transmitting signals to a satellite or relay station. The adaptive transmitter can be used with a GPS receiver for vectored steering, and can be combined with an adaptive receiver for providing a transceiver having adaptive technique applied to both transmit and receive signals.

The adaptive transmitter can further be used in a radar system so that clutter contributions are less likely to saturate the receiver, or in sonar systems to avoid reflections from isotherms that degrade detection performance. Radar systems have performance degraded by clutter reflections. These and other advantages will become more apparent from the following detailed description of the preferred embodiment.

DETAILED DESCRIPTION OF THE PREFERRED EMBODIMENT

Figure 1:
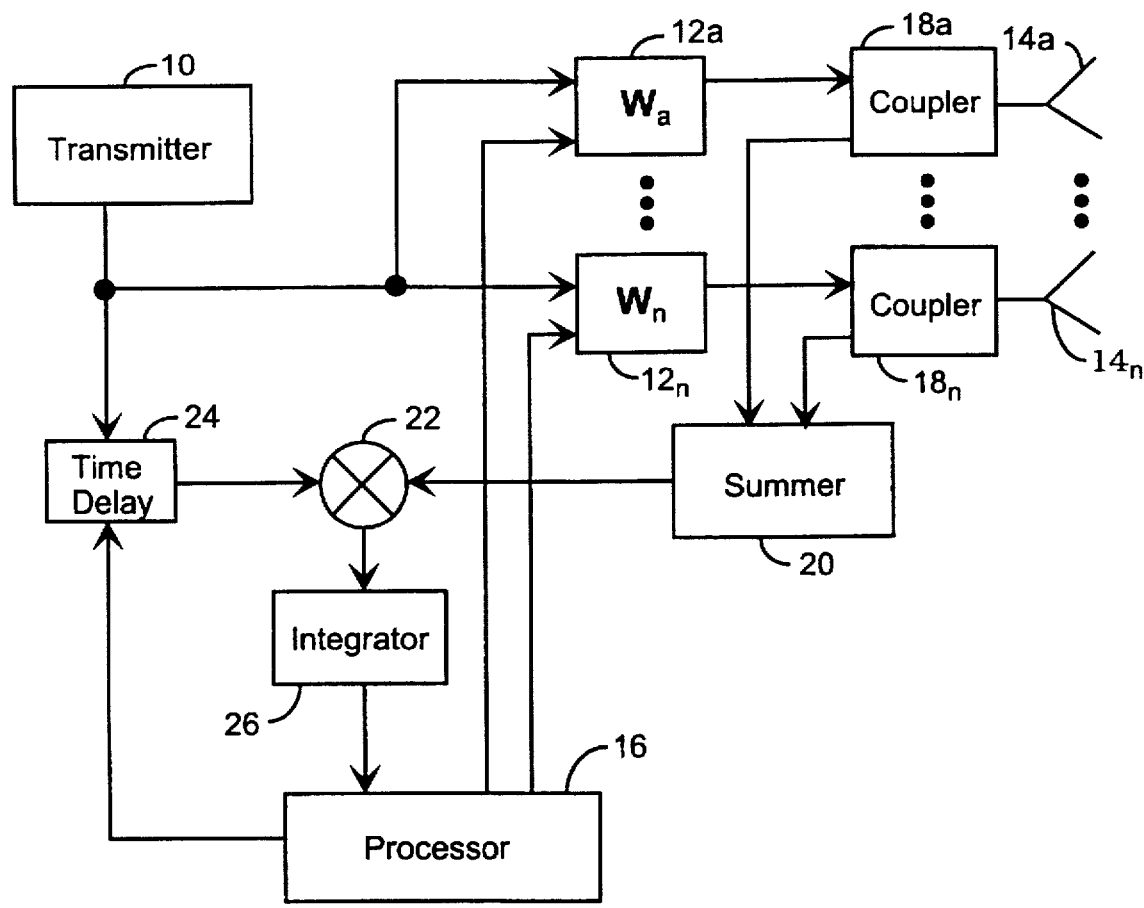
FIG. 1 is a block diagram of an adaptive transmitter.

The embodiment of this present invention is described with reference to the figures and their reference designations. In FIG. 1, a transmitter 10 is connected to an array of antenna elements 14a–n through weighing circuitry 12a–n. The array of antenna elements 14 may be vector array of antenna elements. These elements 14 collectively produce respective component signals of the transmitted signal. The plurality of weighting elements 12a–n provide respective amplitude and phase weighting of the transmitted signal components. The amplitude and phase of each weighting element 12a–n is controlled by a processor 16. Weighting elements 12a–n are respectively connected to couplers 18a–n respectively connected to vectored antenna elements 14a–n which broadcast the superimposed weighted transmit signal components. The weighted transmission signals may be reflected as reflected signals consisting of reflected component signals subsequently respectively received by the antenna elements 14a–n. Antenna elements 14a–n are respectively connected to couplers 18a–n which communicate respective transmit and receive signal components. The received signal components are summed by a summer 20. The transmit signal broadcasted by the array elements 14 are reflected from nearby objects, not shown. The strength of these reflected signals depend on the illumination of the reflecting objects. The couplers 18a–n are bidirectional devices which respectively couple the weighted transmission component signals from the weighting elements to the antenna elements 14a–n, and respectively communicate the reflected component signals from the antenna elements 14a–n to a summer 20 which provides a sum signal to a mixer 22. The transmission signal is delayed by a time delay 24 which is controlled by the processor 16. The time delay 24 provides for one or more time delays. The time delayed transmission signal is cross correlated with the sum signal using the mixer 22 and an integrator 26 providing a cross correlation output to the processor 16. That is, the transmitted signal is delayed in time 24 and cross-correlated with the reflected component signals. The correlated output is proportional to the reflected component signal within a prescribed range of separation distances from the transmitting antenna array 14. This correlated output is communicated to the processor 16, which uses adaptive algorithms to reduce the strength of the reflected component signal by varying the values of the adaptive weights 12aN to reduce the correlation output. By minimizing the illumination of the reflecting objects, transmitted multipath components are reduced. During transmission of the transmitted signal towards the receiver, the transmitted signal may be reflected by proximal objects, not shown, located proximal to the transmitter. The reflections result in the creation of proximal multipath signals. The adaptive technique of the adaptive antenna reduces proximal multipath signals resulting in lower distortion of the transmitted signal. The transmitter is preferably a CDMA transmitter broadcasting a spread spectrum CDMA modulated transmit signal coded by an individual code. The antenna elements 14 preferably function as a vector antenna providing a composite transmitted beam toward a receiver, not shown, which may be a communication satellite. The weighing elements 12 have amplitude and phase values which direct the composite transmitted beam towards the communication satellite.

The processor 16 can select one or more time delay values of the time delay 24. Certain reflective signals at respective time delays are more disruptive to reception of the primary signal by virtue of coherent multipath signals. These coherent multipath signals are not completely decorrelated upon reception and must be removed from the cross correlation output. The time delay values correspond to the most significant side lobe peaks within an auto correlation function defined by the coded spread spectrum. The time values correspond to time delays of reflected multipath signals. Not all multipath signals will produce distortion. Only multipath signals that are coherent with the primary signal at predetermined time delays will cause distortion. The cross-correlation between the sum signal and the time delayed transmit signal delayed by one or more of the time values provides for the cross-correlation output value at the integrator 26. The cross correlation output indicates the presence of disruptive multipath signals that will distort function iy signal. The processor 16 function is to determine the weighting values which minimize the correlation output. The processor 16 adjusts the weighting amplitude and phase value of the weighting elements 12 to reduce the cross correlation output to thereby reduce proximal disruptive multipath signals.

The auto-correlation function determines those time delay values corresponding to potential disruptive multipath signals. Thus, the selected code and bandwidth determines the potential time delays to be selected. One or more of the these time delays are selected preferably and as selectable taps of the time delay 24. The processor 16 selects time delays in sequence to delay the transmit signal which is then cross-correlated in sequence with the reflected signals to generate respective cross-correlation outputs indicating the amount of distributive multipath signals at respective time delays. The processor 16 then adjust the weighting values to minimize cross correlation outputs to minimize the disruptive multipath signals at respective time delays.

The processor 16 executes iterative processing by varying one weighting value while holding the remaining ones constant. Such iterative processing methods are well known by those skilled in the art. The processor 16 also adjusts the weighting amplitude and phase values of the weighting elements 12 to direct the beam towards relay station, such as a communication satellite. The wave front of the broadcasted signal is redirected by adjusting the phase of each transmitted component. The antenna elements 14 are preferably a vector of identical elements marginally displaced from each other. The antenna elements 14 may have respective weighting phase shifts adjusted to receive a maximize signal in a particular direction. The phase shifts are set to null multipath distortions yet direct a beam towards a remote receiver, communication satellite or relay station. The steering amplitude and phase for each weighting element 12 results in a beam directed at an angle to present a uniform wave front toward the receiver. The processor 16 would store a steering vector so that the antenna elements 14 function together to project a main beam toward the receiver. The weighting elements 12 are adjusted to not only reduce multipath signals but also to beam steer the transmit signal towards a remote receiver.

The adaptive antenna may be used in personal communication satellite systems where a multitude of small user terminals communicate via a satellite link. In these systems, the individual users must be isolated from one another so that they do not mutually interfere. One means of isolating users is to use a CDMA scheme, where each user is assigned an orthogonal code that spreads the transmit signal over a bandwidth assigned to the system. By correlating the received signal with the code the desired signal can be received. The orthogonal code set has the property that correlation with the correct code yields a strong output for the desired signal. Using cross-correlation in this way, isolation among simultaneous user is achieved by the use of the proper code. Distortions in these coded signals reduce the output level of the received signal. The distortion in the transmitted signals results in interference to other users and the overall performance is degraded for all user signal.

The adaptive transmit system has the ability to control reflections at different separations from the transmitting antenna. The auto correlation properties of the CDMA code together with the selection of the time delay value 24 control the reflections at different spatial separations from the transmitting antennas. In operation, reflections at different separations from the transmitting antenna need to be controlled. Reflecting objects far from the transmitting antenna are not typically troublesome. Because of the large separations, distal objects are not strongly illuminated resulting in low multipath strengths. Moreover, a direct line of sight path to potentially reflecting objects may not be available. A large time delay difference results in decorrelation of the reflected signal reducing disruptive multipath components. Reflections very close to the transmitting antenna experience relatively little delay with reduced distortion. Reflected transmitted components are most disruptive when reflected at intermediate separations from the transmitting antenna. The path delays for these intermediate reflective components add and subtract over the bandwidth causing significant distortions to the transmitted signal. Changes in the distance between the transmitting element 14 and the receiver produce rapid changes in the receiver spectra, and are referred to as fast fading by those experienced in dealing with multipath degradations. Multipath distortions from intermediate separations between the transmitter and nearby objects, produce fast fading of the received signal. The adaptive transmitter reduces fast fading.

The time delay selection and the correlation properties of the code are used to reduce reflections that are most disruptive to transmission performance. One or more delay values can be used to reduce multipath distortions from the transmitting antenna. The weighting circuits 12a–n would include amplitude and phase weighing coefficients to provide the adaptive equalization. The weighing circuits 12 may include delay components for equalization in wideband systems. The delay components insert multiple time delays with amplitude and phase control for each delay components all of which are summed an equalized output. The processor 16 controls the weighing circuitry 12 in minimizing reflected components. A typical control implementation would be a constrained least mean square (CLMS) technique capable of rapidly determining the adaptive weight values. However, such solutions must contain constraints to avoid the trivial solution of setting the weight values to zero which indeed minimizes reflections but also results in no transmitted signal. Thus, the adaptive control algorithms in the processor 16 must contain constraints to preclude this trivial solution. A common constraint is maintaining beam pointing in the direction of the desired signal direction.

Figure 2:
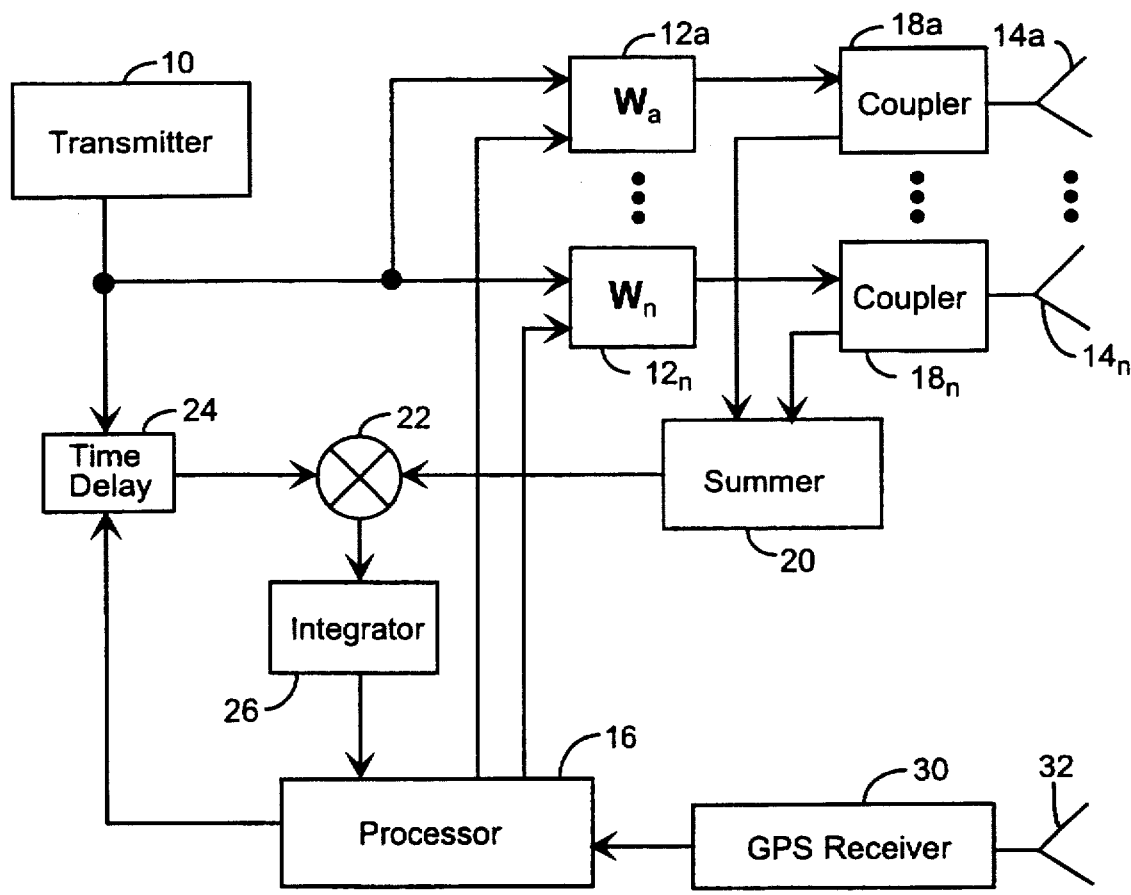
FIG. 2 is a block diagram of an adaptive GPS transmitter.

Referring to FIG. 2, a GPS receiver 30 and GPS antenna 32 can be included in a GPS adaptive transmitter also having the transmitter 10, weights 12, transmit antenna element 14, processor 16, couplers 18, summer 20, mixer 22, time delay 24, and integrator 26. The GPS receiver 30 is used to determine the transmitter location, and hence the pointing direction of the antenna 14. The processor 16 would have the additional requirement to derive the pointing direction from the location determined from the GPS receiver 30 and the location of the relay station. The location of the relay station can be obtained by ephemeris information broadcasted by the relay station. The GPS adaptive transmitter using GPS location to steer the transmit beam towards a remote receiver, not shown, such as a satellite.

Satellite communication systems cover a large broadcast area which may include a relatively large number of transceivers, and therefore are used to communicate a large number of coded signal. Adaptive transmission technique provide for improve isolation between the many coded signals which might otherwise cross correlate with each other increasing interference.

Figure 3:
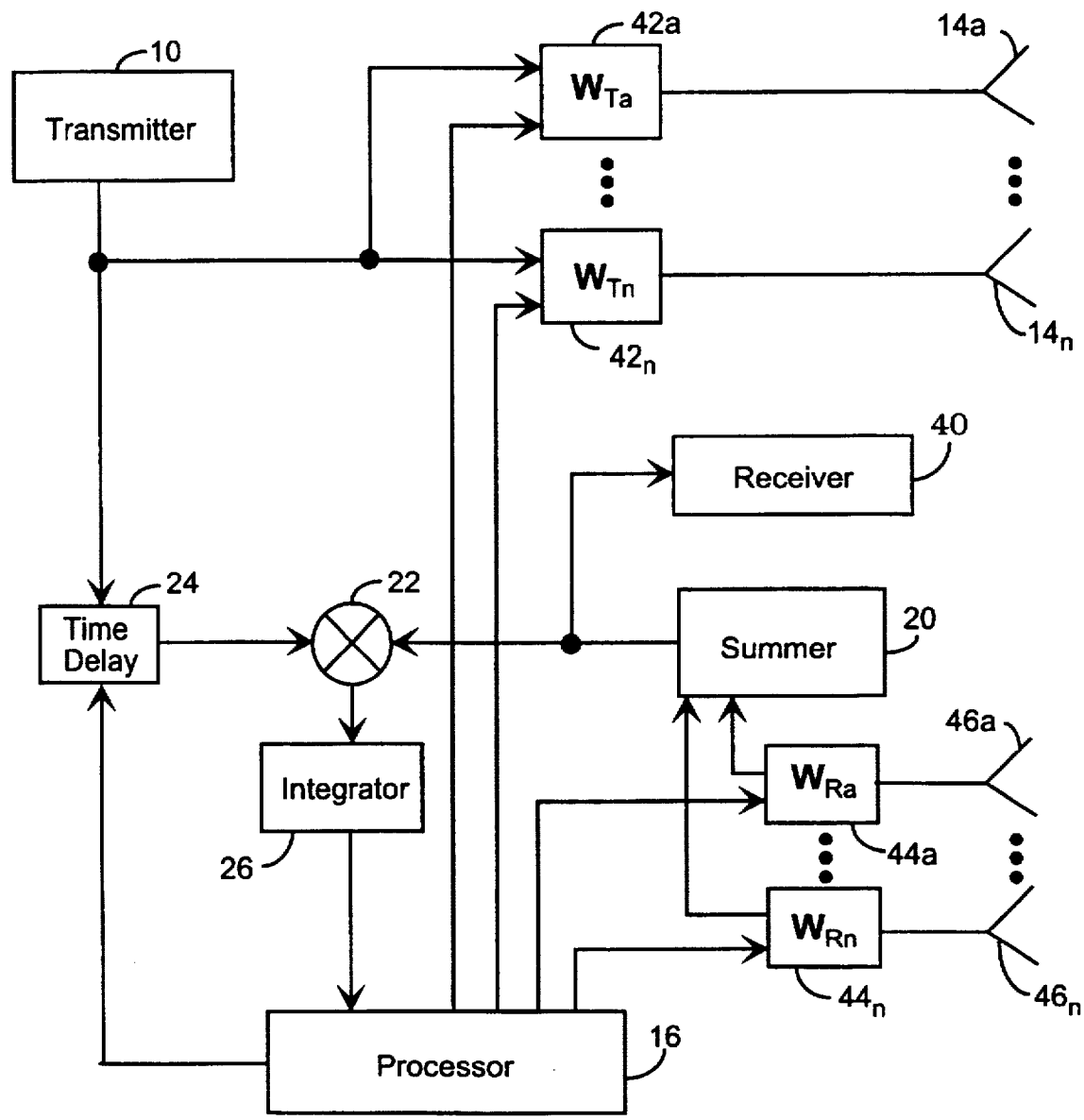
FIG. 3 is a block diagram of an adaptive transceiver.

Referring to FIG. 3, the adaptive transmit antenna system can also be integrated with a receiving system to form a complete adaptive transceiver. Adaptive techniques are well suited for both the user transmitters and receivers comprising a combination antenna elements and adaptive equalization within weighing circuitry. These adaptive techniques improve performance for an individual user by reducing received multipath levels. By controlling the distortion of the transmitted signal adaptively, interference with other systems is reduced. An integral adaptive transceivers employs coupled adaptive transmission and reception techniques. The adaptive transceiver is preferably used in a satellite communication CDMA system. Satellite communication systems have a limited bandwidth, e.g. 30 MHz, in which to communicate many user signals. CDMA spread spectrum modulation is used to encode many user signals within this limited bandwidth. The code is used to isolate user signals from each other. The equalization techniques remove distortion over that band width. RAKE receivers seek to remove multipath signals, within the 30 MHz band width, that distort the primary signal. The great number of user signals within the band width require improved isolation techniques. Multipath signals generated by one user presents additional potential interfering signals to disrupt not only the individual transmitter signal, but also other transmit signals from other users. With the multiplicity of the codes using the cross-correlation isolation method to acquire the primary signal, the adaptive transmitter is used to not only remove disruptive signal for the individual user signal, but also remove disruptive signals which may distort transmit signals from other the users. Hence, the reduction of the multipath signals from a transmitter reduces distortion of signal from the transmitter and also reduces potentially disruptive signal from interfering with other transmitted signal using similar codes and cross-correlation methods over the same band width.

The adaptive transceiver is preferably enabled by the transmitter 10, transmission weights, a–n, transmit antenna elements 14, processor 16, summer 20, mixer 22, time delay 24, and integrator 26, as well as a receiver 40, reception weights 44a through 44n and respective reception antenna elements 46a through 46n. The processor 16 determines the adaptive weighing values for the receive antenna. The summer 20 receives signals from the reception antenna elements 46 weighted by reception weights 44. The summer output is mixed by the mixer 22 with transmitted signal delayed by time delay 24 providing a mix output which is integrated by integrator 26 to provided the cross correlation output between a delay transmission signal and received signals. The processor 16 is used to minimize received multipaths by varying both the transmission weight 42 and reception weight 44. The adaptive transceiver thus includes an additional receiver 40 and receive antenna elements 46. The elements 42 and 46 can be replaced with a dual frequency design where the transmit and receive signals are separated by diplexers, not shown. The adaptive weighing values for transmit weights 42 differ from the values for receive weights 44 even in the case of a dual frequency design because the receive and transmit frequencies are different to avoid self interference. The difference in the receive and transmit frequencies decorrelates the multipath so that the optimum weighing values differ between the transmit and receive frequencies.

The present invention is an adaptive transmitter having a vector antenna for adaptive transmission to reduce multipath signals to reduce distortion of the transmit signal and to reduce potentially disruptive signals interfering with other transmit signals communicated within the same band width. The vector antenna includes weighting elements for adaptive transmissions. The weighted vector antenna is also preferably used for beam steering within satellite communication systems. The adaptive transmitter can be further improved and enhanced. However, those enhancements, improvements and modifications may nonetheless fall within the spirit and scope of the following claims.

What is claimed is:

1. An adaptive transmitter for transmitting a transmit signal, the adaptive transmitter comprising, a transmitter means generating the transmit signal, a weighting means for coefficient weighting of respective strengths of respective transmit signal portions of the transmit signal, an array of transmit antenna elements for respectively transmitting the transmit signal portions, and for receiving respective reflected portions, a cross correlation means for providing a cross correlation output from a cross correlation of the sum of the respective reflective portions and the transmit signal, the cross correlation output is a measure of interfering reflections received at the array of transmit antenna elements, and processing means for sensing the cross correlation output and for controlling the weighting means to minimize the cross correlation output.

2. The transmitter in claim 1 further comprising, delay means for generating a delayed transmit signal communicated to said cross correlation means for cross correlation with said sum.

3. A GPS adaptive transmitter for transmitting a transmit signal to a communication system, the adaptive transmitter comprising, a transmitter means generating the transmit signal, a weighting means for coefficient weighting of respective strengths of respective transmit signal portions of the transmit signal, an array of transmit antenna elements for respectively transmitting the transmit signal portions, and for receiving respective reflected portions of the transmit signal after transmitting the transmit signal by the transmitter, a cross correlation means for providing a cross correlation output from a cross correlation of the sum of the respective reflective portions and the transmit signal, the cross correlation output is a measure of interfering reflections received at the array of transmit antenna elements, and a GPS receiver for receiving GPS signals, and processing means for sensing the cross correlation output and for controlling the weighting means to minimize the cross correlation output, and for receiving the GPS signal and therefore locating the adaptive transmitter for controlling the weighting means to direct the adaptive antenna array towards the communication system.

4. An adaptive transceiver for transmitting a transmit signal and receiving a receive signal, the adaptive transceiver comprising, a transmitter means generating the transmit signal, a receiver means for receiving the receive signal, transmit weighting means for coefficient weighting of respective strengths of respective transmit signal portions of the transmit signal, receive weighting means for coefficient weighting of respective strengths of respective receive signal portions of the transmit signal, an array of transmit antenna elements for respectively transmitting the transmit signal portions, an array of receive antenna elements for respectively receiving the receive signal portions comprising respective reflected portions, a cross correlation means for providing a cross correlation output from a cross correlation of the sum of the respective reflective portions and the transmit signal, the cross correlation output is a measure of interfering reflections received at the array of receiver antenna elements, and processing means for sensing the cross correlation output and for controlling both the transmit weighting means and receive weighting means to minimize the cross correlation output.

* * * * *